Figure 1:
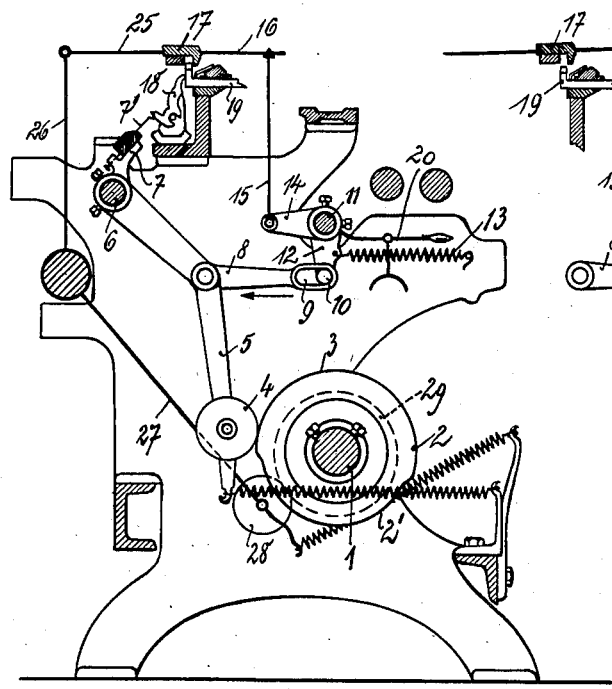

May 30, 1933.    P. LIEBERKNECHT    1,911,833
HOSIERY FRAME
Filed Oct. 24, 1931

Inventor:
Paul Lieberknecht.

Patented May 30, 1933

1,911,833

UNITED STATES PATENT OFFICE

PAUL LIEBERKNECHT, OF EINSIEDEL-CHEMNITZ, GERMANY, ASSIGNOR OF ONE-HALF TO MASCHINENFABRIK EINSIEDEL GESELLSCHAFT MIT BESCHRANKTER HAFTUNG, OF EINSIEDEL NEAR CHEMNITZ, GERMANY

HOSIERY FRAME

Application filed October 24, 1931, Serial No. 570,936, and in Germany January 7, 1931.

The present invention relates to a device for producing the facing bar stroke in flat hosiery frames, and particularly in cotton frames.

Outside the sinking period, facing bars in these machines serve also for holding in position the short-footed jack sinkers which they release by lifting. This motion of the facing bars is effected by means of an eccentric disposed on a cam shaft and actuating a roller lever rigidly secured to another shaft, the roller lever actuating through its shaft rods connected with the facing bar. The shaft moved by the roller lever, in addition to being connected with the known mechanical driving device described, is further connected with a hand-operated device by means of which the facing bar may be lifted also.

In modern machines of the type mentioned lack of space, especially with respect to the eccentric shaft, is becoming increasingly noticeable. The invention proposes to eliminate this crowding by causing the facing bar stroke to be controlled by the known drive for moving the spring block, the connection between the spring block actuating means and the facing bar drive being such as to permit the spring block actuating means to impart its motion to the facing bar drive only in the direction of the upward stroke of the facing bar, the descent of the facing bar being effected by spring power. This means that only one eccentric is required for both devices so that there will be room enough on the eccentric shaft to arrange thereon eccentrics serving for other purposes. Furthermore, this novel arrangement eliminates several transmission members and thus insures a considerable simplification of the machine itself.

It has been proposed already to move the rods actuating the spring block as well as the rods for raising and lowering the facing bar by means of the eccentric bringing about the stroke of the facing bar. In a drive of this kind it is, however, impossible to forthwith move the facing bar alone upward by hand, which is necessary as soon as individual jack sinkers have to be exchanged. In order to be able to do this, in all known devices the connections between the facing bar drive and the spring stock actuating means must be dissolved. Since these connections are found in large numbers all over the machine and, in a 24 gauge machine, amount, for example, to at least 12, it would be necessary, in the example mentioned, to dissolve at least 12 connections with the spring block in order to be able to lift the facing bar by hand. The invention eliminates this defect entirely by providing that the drive for the facing bar stroke, which operates at each course, take place from the spring block shaft or spring block drive and that the connecting member between the spring block shaft and the shaft for the facing bar stroke be of such a construction as to produce and permit rotation of the facing bar shaft only in the direction of the upward stroke of the facing bar while the rotation of this shaft in the opposite direction is effected by a spring. On the other hand, owing to the provision of a slot in the member transmitting motion from the spring block shaft to the facing bar shaft, it is possible to rotate instantly by hand the facing bar shaft, in the direction of the upward stroke of the bar without transmitting this rotation to the spring block drive. For this purpose, this connection must be somewhat loose on one side, and in order to attain this a common drive of this kind must take place from the spring block shaft or its drive to the shaft for the facing bar stroke and not vice versa, as in the known devices. In a cotton frame, it is not so important to be able to move the spring block by hand without causing this motion to be imparted to the facing bar shaft, but it is vital to do so vice versa.

Figure 2:
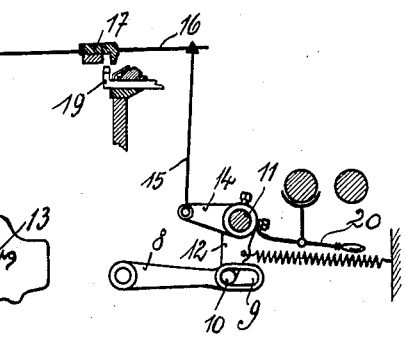
Figure 3:
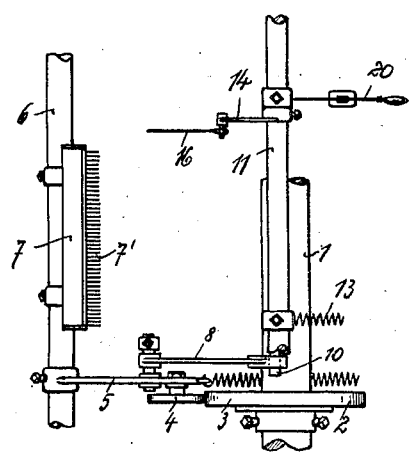

One form of the invention is illustrated by way of example in the accompanying drawing, in which Figure 1 is a diagrammatic front view of a cotton frame in which the facing bar is suitably lifted by mechanical means to be ready for the sinking position; Fig. 2, a detail view of the drive for the facing bar which is raised by hand lever;

and Fig. 3, a top view of the drive for both devices according to Fig. 1.

Referring to the drawing, the eccentric shaft 1 carries the eccentric 2 over whose front edge 3 the roll 4 moves. The roll 4 is disposed on an oscillating lever 5 the upper end of which is secured to a rotary shaft 6 carrying also the spring block 7. This driving arrangement for moving the spring block 7 is known.

To the angular point of the lever 5 a horizontally extending arm 8 is articulated provided at its free end with a recess 9 which is engaged by the finger 10 of the lever 12 vertically clamped to the shaft 11 and constantly actuated by the spring 13. From the shaft 11 the rods 14, 15, 16 lead in the known manner to the facing bar 17.

When the roll 4 is actuated, the springs 7' are moved against the jacks 18 while, simultaneously, the arm 8 is drawn in the direction of the arrow, i. e., to the left. This brings about the raising of the facing bar 17 and the release of the short-footed sinkers 19 (Fig. 1), previously held in position by the bar 17; on the other hand, when the roll 4 moves over the low portion 2' of the eccentric 2, the spring 13 draws back the lever 12 and thereby lowers the facing bar 17.

On the shaft 11 carrying the rods 14, 15, 16 a lever 20 is disposed by means of which the facing bar 17 may be raised by hand in order to exchange, for example, the sinkers 19 when the machine stops. In order to allow the facing bar to move without moving also the spring block 7, the arm 8 is provided with the slot 9 already mentioned which permits sufficient motion to the finger 10. The rods 25, 26, 27, also connected with the facing bar 17 and moved by the eccenter 29 on the shaft 1 over the roll 28, serve for moving the facing bar 17 forward and backward.

I claim:—

In a flat hosiery frame, particularly a cotton frame, a facing bar, means for driving the said bar, a spring block, actuating means for the said spring block adapted to control the facing bar stroke, means for connecting the said spring block actuating means with the said facing bar drive, the said connecting means permitting said facing bar to be moved independently of the said spring block actuating means imparting motion to the said facing bar drive only in the direction of the upward stroke of the said facing bar, and spring means for causing the descent of the said facing bar.

In testimony whereof I have affixed my signature.

PAUL LIEBERKNECHT.